United States Patent [19]

Chen

[11] Patent Number: 4,469,858

[45] Date of Patent: Sep. 4, 1984

[54] TREE FOLIAGE EXTRACTS AND THEIR USE IN PHENOL-ALDEHYDE RESINS

[76] Inventor: Chia-Ming Chen, 205 Dove Valley Dr., Athens, Ga. 30606

[21] Appl. No.: 305,904

[22] Filed: Sep. 25, 1981

Related U.S. Application Data

[62] Division of Ser. No. 126,982, Mar. 3, 1980, abandoned.

[51] Int. Cl.³ .................... C08G 83/00; C08L 61/06; C08L 61/10; C08L 61/14
[52] U.S. Cl. .................................... 528/129; 528/1; 527/105; 260/124 R; 260/112 G; 428/528; 428/529
[58] Field of Search .................. 260/112 G, 124; 527/105; 528/1, 129; 428/528, 529

[56] References Cited

U.S. PATENT DOCUMENTS

| | | | |
|---|---|---|---|
| 2,782,241 | 2/1957 | Gray et al. | 260/124 R |
| 3,062,783 | 11/1962 | Gray et al. | 260/124 R |
| 4,082,903 | 4/1978 | Chow | 523/27 |
| 4,098,765 | 7/1978 | Kays et al. | 528/1 |
| 4,200,273 | 4/1980 | Chen | 260/112 R |
| 4,201,699 | 5/1980 | Chen | 523/27 |
| 4,201,700 | 5/1980 | Chen | 523/27 |
| 4,201,851 | 5/1980 | Chen | 528/1 |

OTHER PUBLICATIONS

"Studies on the use of Bark and Agriculture Residue Components in Phenolic Resins and Glue Mixes," Chen Paper Delivered at the 30th Annual Meeting of Forest Products Research Society, 1976, Toronto, Canada.
"Organic Chemicals from Biomass", Goldstein Ed., CRC Press, Boca Raton, Fla., pp. 249–280.
V. S. R. Das, et al., "Biochemical Studies of the Fresh and 9-Month Stored Pods of Groundnut (*Arachis Hypogaea* L.)", Z. Pflanzenphysiol. Bd. 79:368–371, (1976).

*Primary Examiner*—John Kight, III
*Assistant Examiner*—Nathan M. Nutter
*Attorney, Agent, or Firm*—Mark A. Greenfield; Jean A. Buttmi

[57] ABSTRACT

Tree foliage extracts, their extraction processes, and the use of such extracts in formulating resins suitable for use in plywood adhesives and as wood bonding agents.

6 Claims, No Drawings

TREE FOLIAGE EXTRACTS AND THEIR USE IN PHENOL-ALDEHYDE RESINS

This is a division of application Ser. No. 126,982, filed Mar. 3, 1980, now abandoned.

BACKGROUND OF THE INVENTION

1. Field of the Invention

This invention relates to extracts from tree foliages, processes for such extraction, the use of the extract for the preparation of phenolic-type resins, and the use of such resins in adhesives and as bonding agents for wood laminates, particle board, and the like.

2. Description of Prior Art

For many years agricultural residues, such as tree bark, foliage, peanut hulls, and pecan pith, were regarded as waste products to be disposed of as cheaply as possible. However, in this era of material shortages and ecological awareness, increasing efforts have been directed away from mere disposal and toward positive utilization of such residues. Although most of such residues are still disposed of by burning or dumping, increasingly stringent air and water pollution regulations coupled with the high potential value they may have as raw materials suggests that maximum utilization of the residues is a necessity.

The use of various wood byproducts, namely, tree foliage and barks including pine, oak and redwood, and other residues, such as peanut hulls, walnut shells, wood flour, and coniferous strobiles, as extenders or fillers for phenol-aldehyde resins is well known. It is also known to make alkali extracts of various tree barks, peanut hulls, and pecan pith, and to use such alkali extracts in phenol-aldehyde resin production.

There has, however, been no disclosure of the production of alkali extracts of tree foliages or the use of such extracts as a partial or complete substitute for phenol in phenol-aldehyde condensation under alkaline conditions.

The most relevant prior art of which the applicant is aware, other than the applicant's copending applications, is U.S. Pat. No. 4,082,903, which discloses the use of tree foliage, including coniferous, as an extender and filler for wood adhesives. Identification of the copending application is given at the end of this section.

Additional prior art of which the applicant is aware is as follows: U.S. Pat. No. 1,078,893 relates to extracting tannin from pecan shells and pith. The disclosed process consists of comminuting pecan shells and pith, mixing them with boiling water, and extraction by percolation. There is no disclosure of the use of an alkaline solution.

U.S. Pat. No. 2,574,784 relates to a phenolic resin adhesive composition containing a comminuted bark extender.

U.S. Pat. No. 2,574,785 relates to a process for treating vegetable shell material for use as a constituent of phenol-aldehyde adhesive compositions. The vegetable shell materials specifically disclosed are nut shells, such as walnut, filbert and hickory, the endocarps (stones) of drupes, such as apricot, peach and prune, and the barks of trees.

U.S. Pat. No. 2,675,336 discloses a phenolic resin expecially adapted for use in the manufacture of plywood which is the reaction product of phenol, alkaline redwood bark extract, and formaldehyde. The use of more than 50% alkali soluble redwood bark extract by weight in the phenolic component is disclosed as resulting in resins of substantially reduced reactivity. Wood flower, walnut shell flour, and pulverized oat hulls are disclosed as fillers.

U.S. Pat. No. 2,773,847 discloses the reaction of tree bark fractions with an alkaline compound which is then further reacted with an aldehyde to form a resin. It is disclosed that bark fractions comprising less than about 68% cork prove to be unsatisfactory as the principal ingredients in a caustic-formaldehyde bark adhesive.

U.S. Pat. No. 2,781,286 relates to phenolic resin glue compositions containing extenders, which are finely divided modified vegetable shell materials containing certain alakli derivatives. Vegetable shell materials disclosed are the endocarps of drupes, which include shells of nuts, such as walnut, hickory, palm and filbert, pit shells of fruits, such as peach, prune and apricot, the hulls of grains and seeds, such as oat hulls, and the cones or strobiles of coniferous trees.

U.S. Pat. No. 2,782,241 relates to the digestion of coniferous barks in an aqueous alkaline solution so as to convert part of the water-insoluble portion of the bark to a water-soluble alkali derivative.

U.S. Pat. No. 2,819,295 is similar to U.S. Pat. No. 2,782,241 but relates to a different fraction of the organic chemicals of the bark and is further characterized by retained or combined nitrogen.

U.S. Pat. No. 2,823,223 relates to an approved process for the production of chemical derivatives from coniferous barks by digestion in an aqueous ammonia solution.

U.S. Pat. No. 2,831,022 relates to sodium sulfonate or sulfonic acid derivatives of polymeric phenolic materials occurring in bark and the use of such compositions as chemical intermediates and well drilling additives.

U.S. Pat. No. 3,008,907 relates to an extender for phenolic resins which is an alkali metal reaction product of a conjointly cooked alkaline mixture of a cereal flour and a vegetable material which may be ligno-cellulose. The disclosed cereal flour is wheat flour. The disclosed ligno-cellulose materials are tree bark, nut shells, and the endocarps of drupes.

U.S. Pat. No. 3,017,303 relates to extenders for phenolic resin adhesives which are naturally occurring ligno-cellulose and alkali lignin.

U.S. Pat. No. 3,025,250 relates to phenolic resins which are further reacted with alkali-bark derivatives obtained by treating suitable bark at a temperature of from about 90° to 170° C. with an aqueous alkaline solution.

U.S. Pat. No. 3,053,784 relates to resins derived from a sodium salt of a polymethylol phenol and a sodium substituted bark derivative. It is one of the important aspects of this invention that free formaldehyde is neither present in nor added to the composition.

U.S. Pat. No. 3,093,605 relates to extenders for plywood adhesive solutions composed of a vegetable shell flour extender and minor amounts of an at least partially oxidized extracted lignin and a non-fibrous degradation product of a vegetable shell material.

U.S. Pat. No. 3,093,607 is closely related to U.S. Pat. No. 3,093,605.

U.S. Pat. No. 3,099,633 is closely related to U.S. Pat. No. 3,093,605.

U.S. Pat. No. 3,213,045 relates to phenolic resin adhesives formulated with redwood bark dust resin extenders.

U.S. Pat. No. 3,223,667 discloses a resin composition comprising an alkali-bark derivative and a polymethylol phenolic compound which will polymerize to a phenolic resin and will also condense with the alkali-bark derivative.

U.S. Pat. No. 3,232,897 relates to resorcinol-formaldehyde cold setting adhesive resins incorporating alkali-bark derivatives as an extender.

U.S. Pat. No. 3,268,460 relates to condensing phenol and aldehyde to make a resinous condensate and then further condensing said resin with bark flour.

U.S. Pat. No. 3,293,200 relates to phenol resins containing, as an extender, a water-insoluble, finely-divided humin material obtained from the manufacture of levunic acid by acid hydrolysis of ligno-cellulose.

U.S. Pat. No. 3,328,322 relates to thermosetting molding materials comprising a phenol-aldehyde resin and an alkali-extracted douglas fir bark fiber.

U.S. Pat. No. 3,371,054 relates to alkali-bark derivatives produced by treating bark with an alkali metal hydroxide in strong aqueous solution which is heated sufficiently to carry the batch to a substantially dry state while in a non-oxidizing atmosphere, to form an alkali bark. The alkali bark may be acidified to form an acid bark. Either the acid bark or the alkali bark may be reacted with formaldehyde to form novolak-type or resole-type resins.

U.S. Pat. No. 3,389,101 relates to a resin adhesive for use in the manufacture of plywood which is formulated from a redwood extract composed of phenolics which are solvent-extracted from redwood, and phenol co-reacted with formaldehyde in the presence of an alkali hydroxide catalyst.

U.S. Pat. No. 3,429,770 relates to an extender for plywood glue compositions.

U.S. Pat. No. 3,518,210 discloses an infusable resin formed by reaction of a phenol-aldehyde condensation product with an alkali-bark derivative.

U.S. Pat. No. 3,654,200 relates to a liquid coniferous tree bark alkali which is reacted with a dimethylol amid of a dibasic acid and used as a substitute for up to 65% of phenol-formaldehyde in adhesive resin formulae.

U.S. Pat. No. 3,931,071 relates to lignin sulfonate-phenol formaldehyde glue systems for particle board, hardboard and plywood.

U.S. Pat. No. 4,098,765 relates to simple water extraction of phenolic compounds from pecan pith and shells, and the use of such compounds to manufacture phenolic resins.

Japanese laid-open patent application No. 50/34054 discloses the use of peanut hulls as an extender in phenol-formaldehyde resin adhesives for use in plywood manufacture.

Relevant literature includes the following.

Kottwitz and Forman, *Sodium Palconate*, Industrial and Engineering Chemistry, Volume 40, No. 12, (1948), pages 2443-2450. This article discloses the production of powdered sodium palconate by alkaline extraction of redwood bark dust followed by concentration and spray drying of the extract. The alkali-soluble material was disclosed as consisting mainly of a partially methylated phenolic acid containing aliphatic hydroxyls, phenolic hydroxyls, and carboxyl groups, in the ratio of 2:4:3.

Kulvik, *Chestnut Wood Tannin Extract in Plywood Adhesives*, Adhesives Age, March (1976), pages 19-21. This discloses a phenol-formaldehyde resin in which up to 50% of the phenol is replaced by a chestnut wood tannin extract added prior to the reaction with formaldehyde.

Kulvik, *Chestnut, Tannin Extract as Cure Accelerator for Phenol-Formaldehyde Wood Adhesives*, Adhesives Age, March (1977), pages 33-34. Chestnut wood tannin extract is disclosed as replacing resorcinol and/or paraformaldehyde as an accelerator for the cure of alkaline phenol-formaldehyde adhesive resins and has an accelerating effect on the cure of phenolic adhesives for plywood manufacture.

Saayman and Brown, *Wattle-Base Tannin-Starch Adhesives for Corrugated Containers*, Forest Products Journal, Volume 27, No. 4, April (1977), pages 21-25. Polyphenolic bark tannin is disclosed as a substitute for resorcinol in the production of moisture-resistant corrugated board. The bark tannin of the wattle tree are stated to resemble resorcinol more closely than phenol.

Herrick and Bock, *Thermosetting Exterior-Plywood Type Adhesives from Bark Extracts*, Forest Products Journal, Volume 8, No. 10, (1958), pages 269-274.

McLean and Gardner, *Bark Extracts in Adhesives*, Pulp and Paper Magazine of Canada, Volume 53, August (1952), pages 111-114.

Abe, *Studies on the Lignin-Formaldehyde Resin*, Hokkaido Forest Products Research Institute Research Report No. 55, (1970), pages 1-131.

Hall, Leonard and Nicholls, *Bonding Particle Board With Bark Extracts*, Forest Products Journal, Volume 10, No. 5, (1960), pages 263-272.

Chen and Rice, *Veneer and Assembly Condition Effects on Bond Quality in Southern Pine Plywood*, Forest Products Journal, Volume 23, No. 10, (1973), pages 46-49.

In addition to the above, the inventor presented a paper at the thirtieth annual meeting of the Forest Products Research Society held in Toronto, Canada, on July 13, 1976, entitled "Studies on The Use of Bark and Agricultural Residue Components in Phenolic Resins and Glue Mixes—Part I—Relative Activity Of Bark and Residue Extractives Toward Formaldehyde". This paper disclosed the extraction of phenol-like compounds from southern pine bark, oak bark, pecan nut pith, and peanut hulls. Various extraction means were disclosed including aqueous sodium hydroxide extraction, sulfite pulping method extraction, and hydrolysis by means of the "Hokkaido Process" to produce lignin-like compounds. Some, but not all, of the extracted components reacted rigorously with formaldehdye.

U.S. copending application Ser. No. 814,920 filed July 12, 1977 and Ser. No. 891,596 filed Mar. 30, 1978 relate to phenol aldehyde resin compositions containing pecan pith extracts and an aldehyde.

U.S. copending applications Ser. No. 922,101 filed July 5, 1978 and Ser. No. 931,889 filed Aug. 8, 1978 relate to phenol aldehyde resin compositions containing peanut hull extracts and an aldehyde.

SUMMARY OF THE INVENTION

It has been discovered that a substance can be isolated from tree foliage, which may be reacted with aldehydes under alkaline or acid conditions so as to form phenol-aldehyde resins, which then may be used either alone or in admixture with other ingredients as adhesives or bonding agents, which are heat cured to type C resins. The process of extraction of the useful compounds from the tree foliage is extremely important. The preferred extraction is by reaction of the tree foliage residues with an alkali in an aqueous system at a temperature of from about 20° to about 400° C., under atmospheric or in elevated pressure, and for a time sufficient substantially to react the residue with the alkali, thus producing an alkaline extract solution and/or suspension. The alkaline extract is then treated to remove non-suspended particles, after which the extract is concentrated to from 2 to 100% by weight of solids by water removal, using any conventional means. The alkaline concentrate thus produced is believed to contain various phenols and polyphenols, as well as cellulose derivatives and lignin compounds. This residue extract has been found to be an extremely useful reactant material for the production of phenol-aldehyde resins.

Various types of resin polymers, copolymers and heteropolymers may be produced, depending upon the polymerization method. Some of these resins are as follows.

Resin I The residue extract may be reacted directly with an aldehyde to form a thermosetting resin.

Resin III A conventional type B phenol-aldehyde resin (Resin II) may be simply mixed with Resin I (when still at type B stage), and the mixture may be heat cured.

Resin III-A Resin I and Resin II may be mixed while they are still in the precondensate stage, that is, while they are still type A or early stage type B resins, and then further reacted prior to curing with the addition of further aldehyde if necessary to produce a resin copolymer.

Resin IV Up to 80% of the residue extract may be substituted by phenol and the mixture then reacted with an aldehyde under conventional conditions to produce a resin copolymer.

Resin V A precondensate (type A or early stage type B) of Resin II may be further reacted with the residue extract to produce a copolymer.

The resins thus produced may be used as adhesives for the manufacture of plywood, wood veneers or similar laminates, as well as for bonding particle board, fiber board, strip board, and similar manufactured cellulosic products. The resins may be used either as is, or with the addition of extenders, fillers, gums, etc. The bonding qualities of the adhesives and resins were found to be greatly improved over those of conventional phenol-aldehyde type resins, in that the heat curing time was significantly shorter and the bond was at least as strong and durable, if not better.

DETAILED DESCRIPTION OF THE INVENTION

1. Description of the Raw Materials

The foliage used in this invention may be obtained from coniferous or deciduous trees, or mixtures thereof. However, coniferous tree foliage is the preferred tree foliage used in this invention. The tree foliage may be processed without any further preparation. However, in order to maximize the amount of extracted materials, it is generally desirable to break up the foliage into pieces not larger than about ¼ inch (0.6 cm) in length. The foliage may be reduced to particles of this size by any conventional means, such as using a hammer mill, roller mill, ball mill, etc. The foliage also may be ground into a fine powder or flour, although this does not appear to increase appreciably the amount of extracted material. Foliage useful in this invention can be obtained from a living tree or from logging residues, and may contain minor amounts of twigs, barks, and wood particles.

2. Extraction of Useful Materials

As a preferred method of extracting useful compounds from tree foliage, the tree foliage may be reacted with an alkali in a solvent system, so as to make the desired compounds soluble in that system. Any alkali which will react with these compounds may be used in such a process. However, sodium hydroxide, potassium hydroxide, ammonium hydroxide, or their mixtures are preferred, with sodium hydroxide being most preferred. Any type of organic or inorganic solvent can be used, provided that it can dissolve the alkali salt is formed. However, as a practical matter, an aqueous system is most preferred.

The extraction process can be performed in one stage, or as many as three stages, with a two-stage extraction process being preferred. The extraction process can be conducted at room temperature by immersion of the foliage residue in the alkali medium for a sufficient length of time, usually from 24 to 72 hours.

Where the extraction is to be conducted in one stage, the speed of extraction can be increased noticeably simply by increasing the temperature and/or the concentration of the aqueous alkaline medium. For this purpose, temperatures of from 20° to about 400°, preferably from 20° to about 300° C., and most preferably from about 40° to about 100° C., may be used. Normally, the extraction may be conducted under atmospheric pressure. However, if desired, the extraction process may be further speeded up by sealing the container or by increasing the pressure, which in effect "pressure cooks" the foliage residues. When the extraction is conducted in one stage, the solid:liquid ratio should be from 1:4 to 1:30, preferably from 1:10 to 1:20. The alkali concentration in weight percent may be from 1 to 50% for ammonium hydroxide and from 1 to 30% for sodium hydroxide or potassium hydroxide. Preferable concentrations are from 2 to 20 weight percent, and most preferably are from 2 to 10 weight percent for sodium and potassium, and 7.5 to 30 weight percent for ammonium hydroxide. Where a suitable pressure vessel is available, it would be possible to conduct the extraction at a temperature of 160° C. to 200° C. with alkaline concentrations at 25 to 30% for sodium hydroxide and potassium hydroxide and 30 to 50% ammonium hydroxide, and with a solid:liquid ratio of 1:4 to 1:8.

A multistage extraction process is also possible, with a three-stage process being preferred and a two-stage process being most preferred. In a multi-stage extraction process, the process of the one-stage extraction is simply repeated until all useful materials are removed. Generally, the liquid:liquid weight ratio is decreased for each additional stage. The solid:liquid weight ratio for the first stage should be from 1:2 to 1:15, with ratios of 1:5 to 1:10 being preferred. The solid:liquid ratio for the second stage can be the same, but it is also possible to reduce the liquids up to fifty percent, with the proviso that the total solid:liquid ratio for both stages added cumulatively is at least 1:5. It is also possible to reduce the solid:liquid weight ratio for the first stage with the same proviso applying.

It has been found that a three-stage extraction process does afford some additional yield, but this is generally not sufficient to warrant the increased expenditure of energy. Therefore, a two-stage process is preferred.

When the extract is used per se as a bonding agent for wood particles, it generally is desirable to remove any residue remains which are not suspended in the extract. These residue remains may be removed by any conventional process, such as screening, filtering, or simply decanting the supernatant liquid containing the solubilized extract and fine particles in suspension. The primary reason for removing such residue remains is because, in the production of particle board, strand board, and the like, the bonding agent is sprayed onto the particles and the presence of residue tends to clog the sprayer nozzle. Where the resin is applied by other means, removal of the residue remains may not be necessary. Where the resin is used as an adhesive ingredient for wood lamination, removal of the residue remains is not necessary, and in fact, the residue remains may constitute part of the filler conventionally used in such adhesives.

The extraction process, regardless of the method used, is to continue until at least 2%, preferably 5 to 15% for Southern pine foliage and 5 to 23% for Douglas fir foliage, by weight of crude protein, based upon 100 weight percent of extracted organic substances, is obtained. Because the crude protein content of all foliage is not known, a generally preferred amount is 5 to 15% by weight. The most convenient method for measuring the crude protein is by conventional nitrogen analysis. One of the major advantages of resins prepared in accordance with this invention over conventional phenolic resins and over resins prepared using alkaline tree bark extracts is that the resins of this invention thermoset significantly faster and, therefore, significantly reduce the time required to produce glued wood products, resulting in significant savings in energy consumption and equipment costs.

The alkaline filtrate or the alkaline extract may then be concentrated for purposes of storage or ease of handling. The concentration may be by any conventional means in which the desired amount of water is removed. Generally, it is desired to concentrate the alkaline extract or filtrate to from 2 to 100%, preferably from 40 to 60%, by weight of solids. It also may be desirable to remove substantially all of the water by a technique such as spray drying, to produce a stable dry powder which may be dissolved and/or suspended in water when desired. Where a resin is to be produced from the extract in a continuous flow system, it is generally preferable to concentrate the alkaline extract of filtrate to from 30 to 70% by weight of solids and use the concentrate directly in the next step of the production process.

3. Preparation of Resins

The extracts have been found to be useful as a partial or total substitute for phenol in conventional phenol-aldehyde polymerization under alkali or acid conditions. Such polymerization will produce a thermosetting resin which can be used as a molding compound, adhesive, bonding agent, or ingredient of molding compounds, adhesives, or bonding agents, and the like.

Phenol-aldehyde resins were one of the first thermosetting resins produced commercially. These resins generally can be divided into three distinct stages in the condensation reaction of phenol with aldehyde in alkaline solution. The initial product, type A, is a liquid or semisolid and is converted by continued heating into an intermediate, type B, a relatively insoluble fusible solid. This, when subjected to heat and pressure, is converted (cured) into type C, an insoluble and infusible resin. In the general process of manufacture of plywood, wood veneers, laminates, strip board, and particle board, a type B resin is used and is converted to a type C resin under the influence of heat and pressure when the finished product is produced. Acid, as opposed to alkaline, conditions generally result in production of a non-curable type of resin commonly known as a novolak, with accompanying consumption of a high percentage of phenol. In an alkali medium, more aldehyde is utilized, even though an excess of phenol is employed, and the product is not of the novolak type. However, if the phenol is replaced by a substituted phenol containing only one free active position, for example 2,4-xylenol, only a noncurable novolak resin can be obtained. If the phenol has two free active positions, for example ortho- or para-cresol, partially or slowly curable resins are obtained. Thus, it is generally believed that two or three reactive positions must be available for formation of truly thermosetting resins. Since thermosetting resins are desired in the subject application, any phenol which has at least two, preferably three, reactive positions will be suitable.

Commercially, the mole ratio of formaldehyde to phenol is usually 1–3:1. It is believed that type A resins are similar in structure to novolaks, but more highly substituted. Such a multifunctional chain polymer would readily undergo condensation to a three dimensional structure. This accounts for the physical characteristics of type C resins, which are completely insoluble in all conventional solvents.

The phenols which may be replaced entirely or in part by the extract concentrate include all those which normally are suitable for a reaction with an aldehyde to form a phenol-aldehyde type resin. These include generally alkyl phenols, polynuclear phenols, alkylene-bridge-linked phenols, fused phenols, hydroquinones, cresols, naphthols, resorcinols, xylenols, bisphenols, and more specifically, phenol, naphthol, cresol, resorcinol, xylenol, $C_{1-5}$ alkyl phenols, halophenols, nitrophenols, cyclophenols, and the like. The preferred phenols used in phenol-aldehyde condensations for which the alkaline concentrate can be substituted or which can be replaced by the alkaline concentrate are phenol, cresol, xylenol, cresylic acid, resorcinol, naphthol, $C_{1-5}$ alkyl phenols, polynuclear phenols, fused phenols, bisphenol, halophenols, and nitrophenols. Most preferred are phenol, cresol, xylenol, and resorcinol.

The aldehydes with which the alkaline concentrate and the various phenols may be reacted include all those which are suitable for reaction with phenols to form phenol-aldehyde resins, including formaldehyde, acetaldehyde, butyraldehyde, heptaldehyde, furfuraldehyde, chloraldehyde, alpha-ethyl-beta-propylacrolein, benzaldehyde, glyoxal, pyruvaldehyde, cinnamaldehyde, pyrocatechualdehyde, and the like. Preferred aldehydes are formaldehyde and the formaldehyde polymers which are capable of decomposing to furnish formaldehyde. These include formaldehyde, paraformaldehyde, trioxane, hexamethylene tetramine, furfuraldehyde, and formalin.

RESIN I is designated herein as that resin produced by complete substitution of the extract for phenol in the production of a phenol-aldehyde resin under alkaline conditions. One part by weight of solids of the alkaline concentrate is reacted with from 0.1 to 1.6 parts by weight of solids, preferably from 0.2 to 1.0 parts by weight of solids, of an aldehyde in an aqueous alkaline system at a temperature of from 30° C. to reflux, until viscosity of from 50 to 1500 cps at 25° C. is reached, to form a resin. In one embodiment of this invention, the condensation reaction may be conducted in one step at a preferred temperature of from about 60° to about 90° C. In another embodiment of this invention, the condensation reaction may be conducted at a temperature of from about 30° to about 75° C. (preferably 50° to 70° C.)

until addition is completed, and then conducted at a temperature of from about 55° C. to reflux (preferably 70° C. to reflux) until condensation is completed, to form a resole resin. When the resin is to be used for wood laminate adhesion, it is preferred that condensation be conducted until a viscosity of from 100 to 1500, preferably from about 350 to about 650, cps at 25° C. is obtained. Where the resin is to be used as a bonding agent for particle or strand board, it is preferred that condensation be conducted until a viscosity of from 50 to 800, preferably from about 100 to about 400, cps at 25° C. is obtained.

Because the extract is already sufficiently alkaline, it usually can be reacted directly with the aldehyde without the need for adding additional alkaline catalyst, at the above temperatures and under normal pressure, although it is possible to adjust the alkaline concentration to from 2 to 20, preferably 3 to 15, percent by weight.

RESIN II is used herein to designate a conventional phenolaldehyde (formaldehyde) resin, in which there is no substitution for the phenol by the extracts of this invention, except as specificially indicated.

Unless stated otherwise, the condensation conditions for RESIN I also apply to RESINS III, III-A, IV and V, although a final viscosity of from 20 to 1500, especially 20 to 500 cps at 25° C. is desirable where the resin is to be used for impregnation of cellulosic materials, such as paper, canvas, and wood pulp.

RESIN III is a physical mixture of RESIN I and RESIN II which mixture is then applied as a bonding agent or in a laminate adhesive, and heat cured.

RESIN III-A is a physical mixture of RESIN I and RESIN II, which is then, after thorough mixing, heated together at from 55° C. to reflux so as to form a copolymer, which is then used as an adhesive ingredient for laminates or as a bonding agent, and heat cured.

RESIN IV is one similar to resin II but in which up to 90%, preferably up to 60%, more preferably up to 40%, of the phenol is replaced by the extract and the mixture then reacted with an aldehyde under conventional alkaline conditions, to produce a copolymer resin. Depending upon the amount of replacement by the alkaline concentrate, additional alkali should be added so that the total amount of alkali during the condensation process is from about 2 to about 20% by weight.

RESIN V is a result of condensing a RESIN II precondensate with the alkaline extract, to produce a copolymer. In order for the condensation reaction to proceed properly, the total alkaline concentration must be adjusted to from 2 to 20% by weight. The amount of additional alkali to be added will depend upon the amount and type of alkaline extract that is used.

In the following examples and tables, all percentages are by weight, unless otherwise noted.

EXAMPLE 1—PREPARATION OF ALKALINE EXTRACT 160 g (calculated as bone dry) of Southern pine foliage having a particle size of less than 0.6 cm was charged to a 2000 cc Erlenmeyer flask. Then 1600 g of 5% NaOH aqueous solution was added. The ingredients were mixed well by shaking the flask. The flask was then placed in a gravity convection oven and heated at a temperature of 90°-95° C. for about 17 hours. The contents of the flask were vacuum filtered using Whatman #4 filter paper, to remove non-suspended solid particle residue. The filtrate was put aside and stored at room temperature. The residue was subjected to a second stage extraction using the same equipment, by addition of 1280 g of fresh 5% NaOH aqueous solution and again heated in the gravity convection oven at 90°-95° C. for about 17 hours. The filtration process was repeated and the two filtrates were mixed. The residue was dried and reserved. The filtrate was concentrated by placing it in an open beaker in a forced air oven maintained at 90°-95° C. for several days until a solids concentration of about 30% by weight was reached.

The above process was repeated several times using new raw materials, and the alkaline extracts were mixed together, until a sufficient amount was prepared to conduct various resin syntheses.

EXAMPLES 2-8—ADDITIONAL ALKALINE EXTRACT PREPARATIONS

Additional two-stage extractions were conducted varying the alkaline concentration, the solid:liquid ratio, the temperature, and the raw material from which the extract was to be derived, as shown in Table I.

TABLE I

| Example No. | Raw Material | Temp. (°C.) | Alkaline Concentration (%) | | Solid:Liquid Ratio (1: ) | |
|---|---|---|---|---|---|---|
| | | | First Ext. | Second Ext. | First Stage | Second Stage |
| 2 | Southern pine foliage | 95 | 2 | 2 | 10 | 8 |
| 3 | Southern pine foliage | 95 | 10 | 10 | 10 | 8 |
| 4 | Southern pine foliage | 95 | 2 | 10 | 10 | 8 |
| 5 | Southern pine foliage | 95 | 20 | 20 | 5 | 4 |
| 6 | Southern pine foliage | 40 | 10 | 10 | 6 | 4.8 |
| 7 | Douglas fir foliage | 40 | 10 | 10 | 6 | 4.8 |
| 8 | Hemlock foliage | 40 | 10 | 10 | 6 | 4.8 |

ANALYSIS OF EXTRACT CRUDE PROTEIN CONTENTS

Crude protein contents of extracts from various raw materials, both within and outside the scope of the subject invention, were analyzed as follows.

(a) The extract was neutralized with HCl (pH of 3).
(b) The neutralized product was vacuum evaporated (less than 10 mm Hg. 2-3 hours).
(c) Nitrogen analysis was conducted on a portion of the evaporated residue.
(d) Crude protein content was calculated from the nitrogen content, Nitrogen (%)×6.25=crude protein (%).

An analysis of the crude protein as a percentage of the total organics extracted is shown in Table II.

TABLE II

| Extract (Example) | Crude Protein as Percentage of Organics Extracted |
|---|---|
| Pine foliage - 5% NaOH, 95° C. (Ex. 1) | 8.5 |
| Pine foliage - 10% NaOH, 95° C. (Ex. 3) | 6.6 |
| Pine foliage - 2 & 10% NaOH, 95° C. (Ex.4) | 6.2 |
| Pine foliage - 10% NaOH, 40° C. (Ex. 6) | 6.3 |
| Douglas fir foliage - 10% NaOH, 40° C. | 21.9 |

TABLE II-continued

| Extract (Example) | Crude Protein as Percentage of Organics Extracted |
|---|---|
| (Ex. 7) Hemlock foliage - 10% NaOH, 40° C. | 13.1 |
| (Ex. 8) Peanut Hull - 5% NaOH, 95° C. | 10.2* |
| Peanut Hull - 10% NaOH, 40° C. | 12.2* |
| Pecan Pith - 10% NaOH, 40° C. | 5.6* |
| Pine Bark - 5% NaOH, 95° C. | 1.6* |
| Pine Bark - 10% NaOH, 95° C. | 0.7* |
| Redwood Bark - 5% NaOH, 95° C. | 0.7* |
| Redwood Bark - 10% NaOH, 95° C. | 0.5* |

*Data obtained from U. S. Pat. application Serial No. 814,920 filed July 12, 1977.

EXAMPLE 8—PREPARATION OF RESIN FOR USE IN PLYWOOD

A 3000 cc glass resin reaction kettle (manufactured by S.G.A. Scientific Co., Bloomfield, N.J., U.S.A.) equipped with a thermometer, internal cooling coil, stirrer, and reflux concenser was used. This reaction kettle was charged with 1510 g of the extract of Example 1 (34.3% solids, 60% extract) and mixed with 383 g of 90% phenol (40% phenol); 428 g of 95% paraformaldehyde; and 379 g of water; with continual stirring. While maintaining the stirring throughout the condensation reaction, the temperature of the kettle was raised to from 50° C. to 70° C. and maintained for 90 minutes. The temperature was then raised to from 80° C. to reflux, with continual stirring, until the viscosity reached 450±50 cps at 25° C. as measured by a Brookfield Viscometer, using a No. 2 spindle at 30 rpm, with a factor of 10. This resin was then used in the standard formula given below to prepare an adhesive mixture suitable for plywood manufacture.

EXAMPLE 9—PREPARATION OF RESIN FOR USE IN PARTICLE BOARD

A resin was prepared in the same manner as Example 8 except using 1737 g of the extract of Example 1 (34.8% solids, 60% extracts) and mixed with 447 g of 90% phenol (40% phenol); 446 g of 95% paraformaldehyde; and 119 g of water. The reaction was continued until a final viscosity of 300±50 cps was reached. This resin was suitable for use as a bonding agent of particle board without further preparation. The resin had a higher solids content and a lower water content than those resins to be used in manufacture of plywood, because this is generally preferred for the manufacture of particle board.

EXAMPLES 10-14

Additional resins were prepared in accordance with Example 8 when for use in plywood and Example 9 when for use in particle board, except using the following extracts, substituted for phenol, in the following percentages. The resin for use in plywood manufacture were prepared as adhesives using the formula disclosed herein.

TABLE III

Examples 10-14-Preparation of Resins for Plywood and Particle Board

| Resin Example | Extract Used (Example No.) | Phenol Replacement (%) | For Use In |
|---|---|---|---|
| 10 | 3 | 40 | Plywood |
| 11 | 6 | 40 | Plywood |
| 12 | 7 | 40 | Plywood |
| 13 | 8 | 40 | Plywood |
| 14 | 6 | 40 | Particle Board |

COMPARATIVE EXAMPLE C-1 (Plywood Control)

As a control, plywood was manufactured in the same manner as the examples of this invention, except using a commercially available 100% phenol-formaldehyde resin, having a solid content of 40%, a NaOH content of 5.4%, a viscosity of 650 cps at 25° C. measured with a Brookfield Viscometer using a No. 2 spindle at 30 rpm and a factor of 10, and having 0.08% of free formaldehyde.

COMPARATIVE EXAMPLE C-2 (Particle Board Control)

As a control, particle board was manufactured in the same manner as the examples of this invention using a commercially available 100% phenol-formaldehyde resin having a solid content of 45.0% catalyzed with a catalyst, having 50% solid content, (7% of resin) and 50% NaOH solution (3% of resin), and a viscosity of 350 cps at 25° C. measured with a Brookfield Viscometer using a No. 2 spindle at 30 rpm and a factor of 10.

4. Preparation of an Adhesive for Plywood Manufacture

For all of the plywood specimens manufactured for the purposes of this invention, the following adhesive composition was used.

| Ingredient and Mix Detail | Proportion By Weight |
|---|---|
| Water (tap water as received) | 18.0% |
| Regular grind Phenofil (1) | 10.2% |
| GLU-X Wheat Flour (2) | 3.9% |
| (Mix one minute) Resin to be tested | 7.7% |
| (Mix one minute) 50% NaOH solution | 3.6% |
| (Mix twenty minutes) Resin to be tested (3) | 56.5% |
| (Add slowly for smooth, lump-free mix) Total Ingredients | 100.0% |
| Total resin solids in mix, based on 40% nonvolatile content in liquid resin | 25.7% |

Notes:
(1) a furfural derivative which is a product of Lufkin Pecan Co., Lufkin, Texas, U.S.A.
(2) a product of Robertson Corp., Brownstown, Indiana, U.S.A.
(3) the resin is added in two steps, and totals 64.2% of the entire adhesive composition.

5. Veneer Preparation and Application of Adhesive Composition

Commercial southern pine veneer of one-eighth inch (0.3 cm) thickness was obtained from a middle Georgia mill and cut into 12"×12" (30 cm×30 cm) sheets and used to make 3-ply plywood panels. Prior to usage in panel production, the veneer was checked to assur conformance to a thickness tolerance of ±0.005 inches (1.3 mm) from the stated value. The adhesive composition was applied using a roller spreader (Black Brothers Co., Mendota, Ill., U.S.A.) and controlled within the range of 83-87 pounds per 1,000 square feet of double glue line (lb/MDGL) (equivalent to approximately 41.6 g/1,000 cm²). After spreading, all panel layups were stored in a gravity convection oven at 100° F. (40° C.) (for assembly time periods of 20 and 60 minutes. No prepressing was done, but during assembly time, the layups were stored under a slight deadload to prevent edge lifting. The moisture content of the veneer was approximately 3 to 7%. The 3-ply layups were then hot pressed, one panel per opening, for the various press times, as indicated in Table VI, using a platen temperature of 300° F. (149° C.) and a panel pressure of 200 psi (about 14 kg/cm²). Immediately upon removal from the hot press, the panels was stored in an insulated but unheated oven for an overnight period to simulate hot stacking.

6. Testing of Plywood

Testing of the panels was carried out in accordance with the vacuum-pressure plywood shear method, as described in U.S. Department of Commerce Standard PSI-74. Upon completion of the hot stacking period, the panels were brought to room temperature and cut into three 3¼" (8.26 cm) wide strips, as measured along the face grain axis. The center strip was held in reserve and the two outside strips each cut to yield eight standard plywood shear specimens. The grooving of these two strips was such that, when tested, the specimens were balanced with regard to the effective opening and closing of lathe checks. A total of 12 specimens from each panel, six selected at random from each strip group of eight, were tested according to the vacuum-pressure procedure for exterior glue lines, as outlined in the standard. The figures for wood failure, as shown in the following table, each represent the average of 24 specimens, 12 taken from each of two duplicate panels.

The data in Table IV should be viewed by comparison with the resin of Example C-1, which is a commercial resin used as the control. The manufacturer of this resin recommends a minimum hot press time of 3 minutes, but a hot press time of 4 minutes is generally used for commercial production. It should be noted that many of the resins of the subject invention achieve an acceptable result after only 2 minutes of hot press time, as contrasted with the control resin.

It also should be noted that, in industrial production, the assembly time is generally around 20 minutes. The 60 minute assembly time was used to see whether delays in assembly could be tolerated using the various resins. Of interest is that, in some instances, a 60 minute assembly time produces a lower percentage of wood failure, which indicates that the adhesive is less successful after the time delay. This may be explained by dryout of the glue line. In Table IV, a higher number is desirable.

TABLE IV

Plywood Shear Test Data According to U.S. Standard PSI-74

| Resin Used (Example No.) | Assembly Time (min.) | Percentage of Wood Failure for Various Hot Press Time | | |
|---|---|---|---|---|
| | | Hot Press 2 min. | Hot Press 3 min. | Hot Press 4 min. |
| C-1 | 20 | 27 | 80 | 87 |
| | 60 | 70 | 85 | 91 |
| 8 | 20 | 90 | 85 | 80 |
| | 60 | 87 | 90 | 85 |
| 10 | 20 | 90 | 85 | 82 |
| | 60 | 83 | 80 | 85 |
| 11 | 20 | 89 | 88 | 89 |
| | 60 | 81 | 84 | 80 |
| 12 | 20 | 92 | 84 | 85 |
| | 60 | 86 | 82 | 75 |
| 13 | 20 | 88 | 87 | 85 |

TABLE IV-continued

Plywood Shear Test Data According to U.S. Standard PSI-74

| Resin Used (Example No.) | Assembly Time (min.) | Percentage of Wood Failure for Various Hot Press Time | | |
|---|---|---|---|---|
| | | Hot Press 2 min. | Hot Press 3 min. | Hot Press 4 min. |
| | 60 | 80 | 78 | 82 |

7. Use of Resins in Particle Board Manufacture

Commercial Southern pine particle furnish was used to make a 0.250 in (6.35 mm) thick particle boards. The furnishes were dried to a moisture content of about 4.5% in a dryer. The furnishes were then placed in a drum type blender and the resins were sprayed on the particles giving a relatively uniform application. The particles were then placed on an aluminum plate and formed a uniform mat of 53 cm×61 cm. The mat thus formed was hot pressed at 168° C. for the prescribed press time as indicated in Table V. The resins to be tested were applied at the rate of 8% (in the case of Examples C-2 and 9) and 5% (in the case of Example 14) of resin solids per 100% by weight of bone dry wood.

8. Testing of Particle Board

The strenghth of internal bond of the particle board was measured in accordance with ASTM D-1037(64). The durability of the particle board was tested accordance with the APA 6-cycle Test. The cure time was the actual or extrapolated hot press time needed to reach board thickness of 0.250 in (6.35 mm) immediately after the hot press.

TABLE V

Test Data of Particle Board

| Resin Used (Example No.) | Hot Press Time (Sec.) | Internal Bond (kg/cm²) | | APA 6-Cycle Test | Cure Time To Reach 6.35 mm Thickness (Sec.) |
|---|---|---|---|---|---|
| | | Before NPA Aging | After NPA Aging | | |
| C-2[1] | 75 | Delaminated | | Failed | 120 |
| | 90 | Delaminated | | Failed | |
| | 105 | 10.2 | 5.3 | Passed | |
| | 120 | 11.7 | 11.7 5.7 | Passed | |
| 9[1] | 75 | 5.6 | 2.2 | Passed | 102 |
| | 90 | — | — | Passed | |
| | 105 | — | — | Passed | |
| | 120 9.6 | 7.7 | | Passed | |
| 14[2] | 45 | 0.3 | — | — | 60 |
| | 52 | 2.3 | — | — | |
| | 60 | 4.4 | — | — | |
| | 75 | 5.1 | — | — | |
| | 90 | 6.1 | — | — | |

[1]The resin content was 8% of resin solids per 100% by weight of bone dry wood particles.
[2]The resin content was 5% of resin solids per 100% by weight of bone dry wood particles.

Table V clearly shows the superiority of the resins of the subject invention (Examples 9 and 14) over a commercial resin (Example C-2). The resin of Example 9 in particular, forms an acceptable bond, even after only 75 seconds of press time, whereas the commercial resin needed to have a 105 seconds of press time. From the above, it is clear that the resin of the subject invention permits a saving of approximately 30% of press time, resulting in a corresponding savings of energy and a corresponding reduction of press capacity required for production.

9. The Importance of Reduction of Phenol Consumption in Resin Synthesis and of Press Time Reduction in Plywood and Particle Board Manufacture Phenol, which is one of the two basic chemicals for the phenolic resin used to produce plyood as well as many other products, is one of the products from petrochemical feedstocks. The wood products industries have been experiencing the continuing price increase of phenol in recent years. To ease the tight supply of phenol and to reduce the cost of phenolic resin, an alternative source is needed to obtain the phenol chemicals for use as raw material of phenolic resin synthesis. The phenol used to make resins of the subject invention is at least partially obtained from natural sources.

On the average, processing of plywood takes about 20 minutes from the first application of adhesive up to the point of hot press. At that point, a bottleneck in production occurs, because normal hot pressing takes at least 3 minutes and frequently 3.5 minutes or more for a 3-ply three-eighths inch (approximately 0.95 cm) thick panel, using a conventional phenol-aldehyde resin. To eliminate the bottleneck would require additional hot press capacity, which would be extremely costly and also would consume more energy. Therefore, a reduction of the time for hot pressing will result in a substantial money and energy savings. The resins of this invention can be fully cured in 2 or 2.5 minutes of hot press time, thus saving from 30 to 50% of the energy expenditure and correspondingly lower capital investment.

In the manufacture of particle board, strand board, hard board, or any synthesized cellulosic product of similar nature, the time savings is even more important, because such boards are often thicker than plywood and often require an even longer press time. Thus, the rapid thermosetting resins of the subject invention save even more time and energy in absolute terms.

10. Use of Resins in Molding Powders

When the resins of the subject invention are used for molding, the molding powder consists of type B resin (40-50%), a filler (35-50%), optionally a plasticizer (5%) and small amounts of lubricant and pigments. The powder can be cured in a mold at 120°-185° C. under a pressure of 2,000 pounds per square inch or more. In the standard one-stage process for the manufacture of resin for laminated materials and for lacquers, 1.0 mole of phenol and 1.5 moles of formaldehyde (usually 40% solution) and a basic catalyst are heated. After a few hours, the mixture settles into two layers. After removal of the upper water layer, more water is eliminated by heating in a vacuum. Then the resulting syrup is poured into shallow pans to cool, producing a type B resin, soluble in alcohol. Molding powders are usually made by the two-stage process.

Useful laminated products can be made from such resins and paper, canvas, fibers, and wood.

I claim:

1. In a phenol-aldehyde resin the improvement consisting essentially of substituting for at least part of the phenol, a composition consisting essentially of an alkali, organic, water-soluble extract of coniferous foliage residue, said extract containing at least 2 percent by weight of crude protein, based upon the total weight of extracted organic compounds.

2. The resin of claim 1, wherein the extract contains from 5 to 15 percent by weight of crude protein, based upon the total weight of extracted organic compounds.

3. The phenol-aldehyde resin of claim 1 or 2 polymerized under alkaline conditions which is the reaction product of 1.0 part by solid dry weight of phenol with from about 0.1 to about 1.6 parts by solid dry weight of aldehyde, wherein the extract is substituted for the phenol in an amount of from 10 to 100 percent by weight.

4. The improved resin of claim 3, in which the extract is substituted for the phenol in an amount of from 40 to 60 percent by weight.

5. A phenol-aldehyde novolak resin according to claim 1 or 2 polymerized under acid conditions which is the reaction product of 1.0 parts by solid dry weight of phenol with from about 0.1 to about 1.6 parts by solid dry weight of aldehyde, wherein the extract is substituted for the phenol in an amount of from 10 to 100 percent by weight, with the proviso that the alkalinity of the extract is neutralized.

6. The improved resin of claim 5, in which the extract is substituted for the phenol in an amount of from 40 to 100 percent by weight.

* * * * *